United States Patent
Patwardhan et al.

(10) Patent No.: US 11,120,228 B2
(45) Date of Patent: Sep. 14, 2021

(54) METHOD AND SYSTEM FOR GENERATING GROUND TRUTH LABELS FOR AMBIGUOUS DOMAIN SPECIFIC TASKS

(71) Applicant: Tata Consultancy Services Limited, Mumbai (IN)

(72) Inventors: Manasi Samarth Patwardhan, Pune (IN); Abhishek Sainani, Pune (IN); Shirish Karande, Pune (IN); Smita Ghaisas, Pune (IN); Richa Sharma, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 258 days.

(21) Appl. No.: 16/502,670

(22) Filed: Jul. 3, 2019

(65) Prior Publication Data

US 2020/0104545 A1 Apr. 2, 2020

(30) Foreign Application Priority Data

Jul. 3, 2018 (IN) .............................. 201821024784

(51) Int. Cl.
*G06F 40/30* (2020.01)
*G06F 17/18* (2006.01)
*G06N 7/00* (2006.01)
*G06N 5/02* (2006.01)

(52) U.S. Cl.
CPC .............. *G06F 40/30* (2020.01); *G06F 17/18* (2013.01); *G06N 5/022* (2013.01); *G06N 7/005* (2013.01)

(58) Field of Classification Search
None
See application file for complete search history.

(56) References Cited

U.S. PATENT DOCUMENTS

| 6,773,266 | B1 * | 8/2004 | Dornbush | ................ | G09B 5/14 434/307 R |
| 2018/0247076 | A1 | 8/2018 | Lerner et al. | | |
| 2018/0336683 | A1 * | 11/2018 | Feng | ........................ | G06N 3/08 |

* cited by examiner

*Primary Examiner* — Quynh H Nguyen
(74) *Attorney, Agent, or Firm* — Finnegan, Henderson, Farabow, Garrett & Dunner, LLP

(57) ABSTRACT

This disclosure relates generally to data processing, and more particularly to a method and system for generating ground truth labels for ambiguous domain specific tasks. The system generates reference data corresponding to a regulation statement being processed, using a crowd sourcing mechanism and then processes the reference data using an Expectation Maximization (EM) model. The EM model determines consensus with respect to ambiguity of terms/phrases, validity of questions, and validity of answers, and then based on the determined consensus, provides questions and answers to disambiguate the regulation statement.

6 Claims, 7 Drawing Sheets

METHOD AND SYSTEM FOR GENERATING GROUND TRUTH LABELS FOR AMBIGUOUS DOMAIN SPECIFIC TASKS

PRIORITY CLAIM

This U.S. patent application claims priority under 35 U.S.C. § 119 to: India Application No. 201821024784, filed on Jul. 3, 2018. The entire contents of the aforementioned application are incorporated herein by reference.

TECHNICAL FIELD

This disclosure relates generally to data processing, and more particularly to a method and system for generating ground truth labels for ambiguous domain specific tasks.

BACKGROUND

Regulatory compliance is critical to existence, continuity and credibility of business. Considering an example of software business, software systems are in regulated environments, and software engineers must ensure the software requirements accurately complies with regulatory compliance as described in regulatory compliance documents. However diction of regulatory compliance is highly specialized and ambiguous. The ambiguity in regulatory compliance documents can make it challenging for software engineers to identify and classify important ambiguities in laws and regulations.

The inventors here have recognized several technical problems with such conventional systems, as explained below. Ambiguities in such documents which contain ambiguous statements (which may or may not be regulatory statements) can be solved by involving experts. Experts or subject matter experts can interpret such ambiguous terms. However when the amount of work involved is high (for example, consider that regulation statements in a whole book need to be interpreted), man power required also is high. Which means multiple subject matter experts may be involved in the process of disambiguation of statements. One disadvantage associated with such a process/mechanism is that knowledge of each of the experts may vary from one another. As a result, same statement/sentence may end up having different interpretations.

SUMMARY

Embodiments of the present disclosure present technological improvements as solutions to one or more of the above-mentioned technical problems recognized by the inventors in conventional systems. For example, in one embodiment, a processor implemented method for disambiguation of regulation statements is provided. In this method, at least one regulation statement is fetched as input, via one or more hardware processors. Further, a reference data is generated corresponding to the at least one regulation statement, via the one or more hardware processors. Further, the reference data is processed using an Expectation-Maximization (EM) model, via the one or more hardware processors. The EM model determines consensus with respect to one or more terms in the at least one regulation statement as being ambiguous terms. In this step, label indicating each term in the regulation statement as being ambiguous or unambiguous is collected from the reference data. Further for each label $t_{ijk}$ for $j^{th}$ term in $i^{th}$ regulation statement expertise of a crowd-sourcing information resource who provided the label is determined by comparing the label with corresponding ground truth data, and then an ambiguity intensity of the $j^{th}$ term or phrase is determined based on variation of the label in comparison with corresponding ground truth data, and then a ground truth of the label based on the determined expertise of the crowd-sourcing information source, and the determined ambiguity intensity of the term for which the label has been provided is determined. Corresponding to each term/phrase labelled as ambiguous, a plurality of questions are fetched/obtained from the reference data. Further the EM determines consensus with respect to at least one of the plurality of questions as belonging to a valid set of questions. In this step all labels indicating each of the plurality of questions as being valid or invalid are fetched from the reference data, and for each label $q_{ijlk}$ for $l^{th}$ question on $j^{th}$ term or phrase in $i^{th}$ regulation statement provided by $k^{th}$ crowd-sourcing information resource, expertise of a crowd-sourcing information resource who provided the label is determined by comparing the label with corresponding ground truth data, and then an ambiguity intensity of the $j^{th}$ term or phrase is determined based on extent of variation of the label provided for the $l^{th}$ question by the plurality of crowd-sourcing information resources, and then ground truth of label for the $l^{th}$ question on the $j^{th}$ term is determined based on the determined expertise of the crowd-sourcing information source, and the determined ambiguity intensity of the question for which the label has been provided and the at least one question for which the determined ground truth is valid is added to the valid set of questions. For all the questions in the valid set of questions, a plurality of answers are fetched corresponding to the at least one question belonging to the valid set of questions, from the reference data. Further, consensus with respect to at least one of the plurality of answers as being a valid answer is determined. Determining the consensus involves fetching labels indicating each of the plurality of answers as being valid or invalid, from the reference data; and for each answer $ans_{ijlnk}$ for $l^{th}$ question on $j^{th}$ term or phrase in $i^{th}$ regulation statement provided by $k^{th}$ crowd-sourcing information resource, determine expertise of a crowd-sourcing information resource who provided the label by comparing the label with corresponding ground truth data, determine an ambiguity intensity of the $j^{th}$ term or phrase based on extent of variation of the label provided for the $ans_{ijnk}$ answer by a plurality of crowd-sourcing information resources, and then determine ground truth label for nth answer of the $l^{th}$ question on the $j^{th}$ term of $i^{th}$ regulation statement based on the determined expertise of the crowd-sourcing information source, and the determined ambiguity intensity of the question for which the label has been provided. Further, the at least one regulation statement, the one or more ambiguous terms, an ambiguity score of each of the one or more ambiguous terms or phrases, the at least one question belonging to the valid set of questions, the at least one valid answer, are provided as output.

In another embodiment, a system for disambiguation of regulation statements is provided. The system includes one or more communication interfaces, a memory module storing a plurality of instructions, and one or more hardware processors coupled to the memory via the one or more communication interfaces. The one or more hardware processors are configured by the instructions to fetch at least one regulation statement as input, generate reference data corresponding to the at least one regulation statement, and then process the reference data using an Expectation-Maximization (EM) model. The EM model determines consensus with respect to one or more terms in the at least one regulation statement as being ambiguous terms. In this step, label indicating each term in the regulation statement as being ambiguous or unambiguous is collected from the reference data. Further for each label $t_{ijk}$ for $j^{th}$ term in $i^{th}$ regulation statement expertise of a crowd-sourcing information resource who provided the label is determined by comparing the label with corresponding ground truth data, and then an ambiguity intensity of the $j^{th}$ term or phrase is determined based on variation of the label in comparison with corresponding ground truth data, and then a ground truth of the label based on the determined expertise of the crowd-sourcing information source, and the determined ambiguity intensity of the term for which the label has been provided is determined. Corresponding to each term/phrase labelled as ambiguous, a plurality of questions are fetched/obtained from the reference data. Further the EM determines consensus with respect to at least one of the plurality of questions as belonging to a valid set of questions. In this step all labels indicating each of the plurality of questions as being valid or invalid are fetched from the reference data, and for each label $q_{ijlk}$ for $l^{th}$ question on $j^{th}$ term or phrase in $i^{th}$ regulation statement provided by $k^{th}$ crowd-sourcing information resource, expertise of a crowd-sourcing information resource who provided the label is determined by comparing the label with corresponding ground truth data, and then an ambiguity intensity of the $j^{th}$ term or phrase is determined based on extent of variation of the label provided for the $l^{th}$ question by the plurality of crowd-sourcing information resources, and then ground truth of label for the $l^{th}$ question on the $j^{th}$ term is determined based on the determined expertise of the crowd-sourcing information source, and the determined ambiguity intensity of the question for which the label has been provided and the at least one question for which the determined ground truth is valid is added to the valid set of questions. For all the questions in the valid set of questions, a plurality of answers are fetched corresponding to the at least one question belonging to the valid set of questions, from the reference data. Further, consensus with respect to at least one of the plurality of answers as being a valid answer is determined. Determining the consensus involves fetching labels indicating each of the plurality of answers as being valid or invalid, from the reference data; and for each answer $ans_{ijlnk}$ for $l^{th}$ question on $j^{th}$ term or phrase in $i^{th}$ regulation statement provided by $k^{th}$ crowd-sourcing information resource, determine expertise of a crowd-sourcing information resource who provided the label by comparing the label with corresponding ground truth data, determine an ambiguity intensity of the $j^{th}$ term or phrase based on extent of variation of the label provided for the $ans_{ijnk}$ answer by a plurality of crowd-sourcing information resources, and then determine ground truth label for nth answer of the $l^{th}$ question on the $j^{th}$ term of $i^{th}$ regulation statement based on the determined expertise of the crowd-sourcing information source, and the determined ambiguity intensity of the question for which the label has been provided. Further, the at least one regulation statement, the one or more ambiguous terms, an ambiguity score of each of the one or more ambiguous terms or phrases, the at least one question belonging to the valid set of questions, the at least one valid answer, are provided as output.

In yet another embodiment, a non-transitory computer readable medium for disambiguation of regulation statements is provided. The non-transitory computer readable medium executes the following method to perform the disambiguation of the regulation statements. In this method, at least one regulation statement is fetched as input. Further, a reference data is generated corresponding to the at least one regulation statement. Further, the reference data is processed using an Expectation-Maximization (EM) model. The EM model determines consensus with respect to one or more terms in the at least one regulation statement as being ambiguous terms. In this step, label indicating each term in the regulation statement as being ambiguous or unambiguous is collected from the reference data. Further for each label $t_{ijk}$ for $j^{th}$ term in $i^{th}$ regulation statement expertise of a crowd-sourcing information resource who provided the label is determined by comparing the label with corresponding ground truth data, and then an ambiguity intensity of the $j^{th}$ term or phrase is determined based on variation of the label in comparison with corresponding ground truth data, and then a ground truth of the label based on the determined expertise of the crowd-sourcing information source, and the determined ambiguity intensity of the term for which the label has been provided is determined. Corresponding to each term/phrase labelled as ambiguous, a plurality of questions are fetched/obtained from the reference data. Further the EM determines consensus with respect to at least one of the plurality of questions as belonging to a valid set of questions. In this step all labels indicating each of the plurality of questions as being valid or invalid are fetched from the reference data, and for each label $q_{ijlk}$ for $l^{th}$ question on $j^{th}$ term or phrase in $i^{th}$ regulation statement provided by $k^{th}$ crowd-sourcing information resource, expertise of a crowd-sourcing information resource who provided the label is determined by comparing the label with corresponding ground truth data, and then an ambiguity intensity of the $j^{th}$ term or phrase is determined based on extent of variation of the label provided for the $l^{th}$ question by the plurality of crowd-sourcing information resources, and then ground truth of label for the $l^{th}$ question on the $j^{th}$ term is determined based on the determined expertise of the crowd-sourcing information source, and the determined ambiguity intensity of the question for which the label has been provided and the at least one question for which the determined ground truth is valid is added to the valid set of questions. For all the questions in the valid set of questions, a plurality of answers are fetched corresponding to the at least one question belonging to the valid set of questions, from the reference data. Further, consensus with respect to at least one of the plurality of answers as being a valid answer is determined. Determining the consensus involves fetching labels indicating each of the plurality of answers as being valid or invalid, from the reference data; and for each answer $ans_{ijlnk}$ for $l^{th}$ question on $j^{th}$ term or phrase in $i^{th}$ regulation statement provided by $k^{th}$ crowd-sourcing information resource, determine expertise of a crowd-sourcing information resource who provided the label by comparing the label with corresponding ground truth data, determine an ambiguity intensity of the $j^{th}$ term or phrase based on extent of variation of the label provided for the $ans_{ijnk}$ answer by a plurality of crowd-sourcing information resources, and then determine ground truth label for nth answer of the $l^{th}$ question on the $j^{th}$ term of $i^{th}$ regulation statement based on the determined expertise of the crowd-sourcing information source, and the determined ambiguity intensity of the question for which the label has been provided. Further, the at least one regulation statement, the one or more ambiguous terms, an ambiguity score of each of the one or more ambiguous terms or phrases, the at least one question belonging to the valid set of questions, the at least one valid answer, are provided as output.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
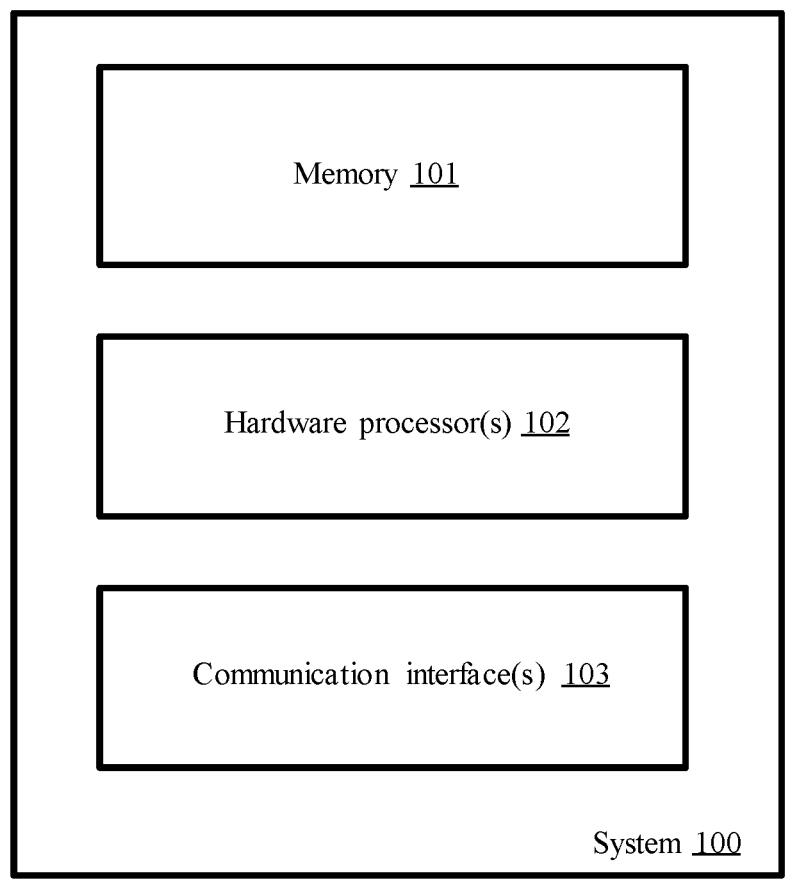
FIG. 1 illustrates an exemplary system for regulation disambiguation, according to some embodiments of the present disclosure.

FIG. 1 illustrates an exemplary system for regulation disambiguation, according to some embodiments of the present disclosure. The system 100 includes at least one memory 101, one or more hardware processors 102, and at least one communication interface 103.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the hardware processor(s) 102 are configured to fetch and execute computer-readable instructions stored in the memory 101, which causes the hardware processor(s) 102 to perform actions depicted in FIGS. 2, 3, 4, and 5 for performing the regulation disambiguation. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 101 stores a plurality of instructions which when executed, cause the one or more hardware processors 102 to perform the actions depicted in FIGS. 2 to 6, to perform the regulation disambiguation being handled by the system 100.

Figure 2A:
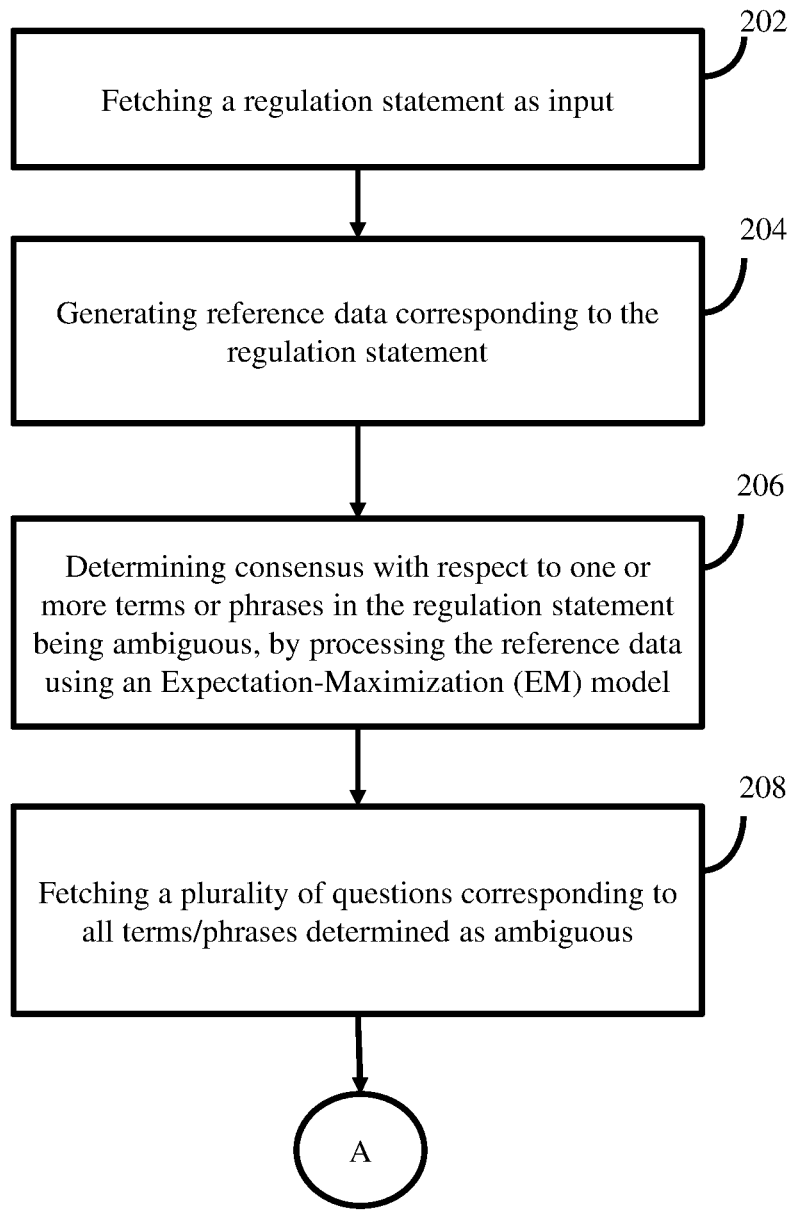
FIG. 2A is a portion of a flow diagram depicting steps involved in the process of regulation disambiguation using the system of FIG. 1, according to some embodiments of the present disclosure.
Figure 2B:
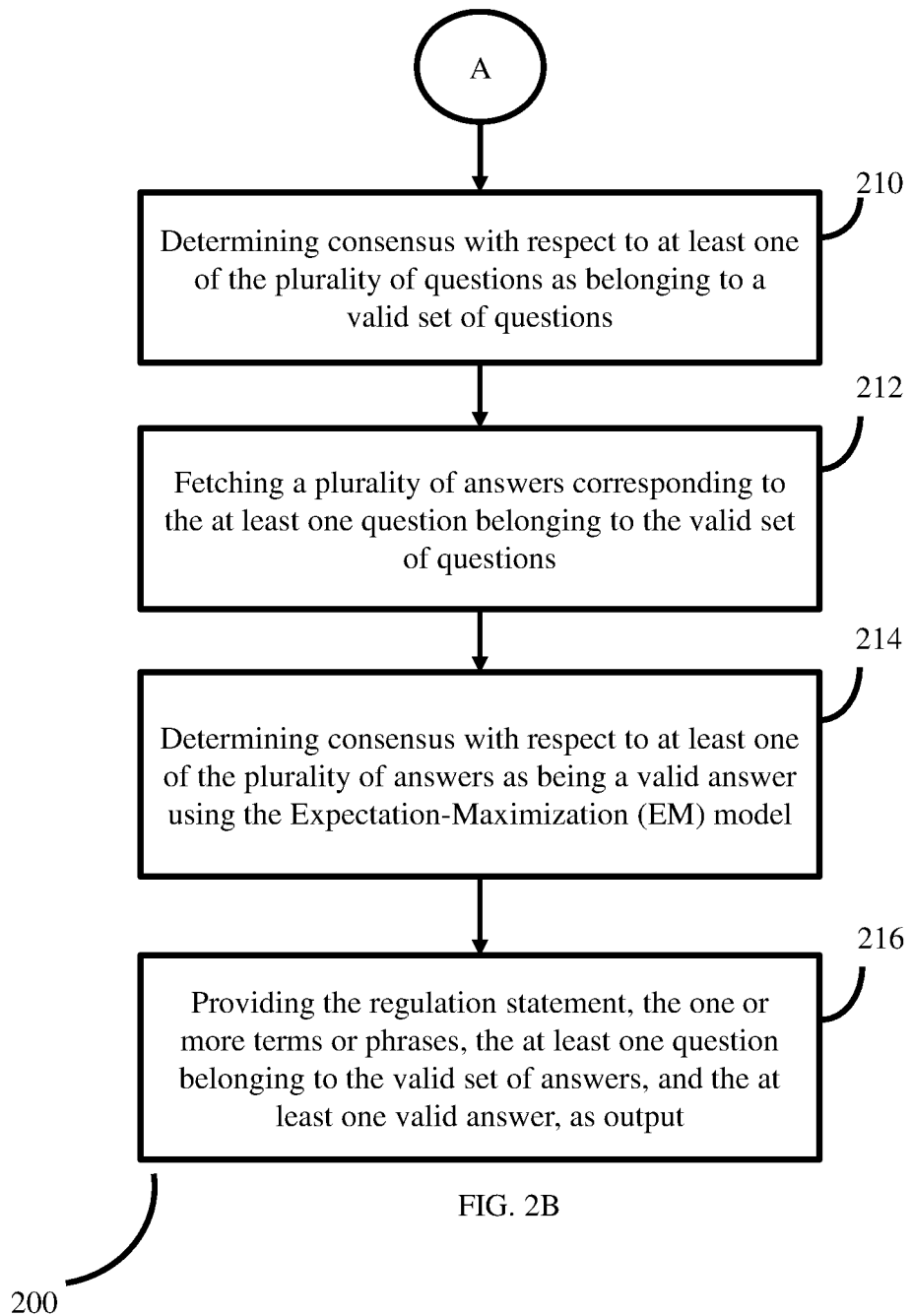
FIG. 2B is a portion of the flow diagram of FIG. 2A depicting steps involved in the process of regulation disambiguation using the system of FIG. 1, according to some embodiments of the present disclosure.

FIG. 2 (including FIG. 2A and FIG. 2B) is a flow diagram depicting steps involved in the process of regulation disambiguation using the system of FIG. 1, according to some embodiments of the present disclosure. The system 100 fetches (202) a regulation statement as input. It is to be noted that the system 100 may be able to fetch more than one regulation statements and process at once. However for the purpose of explaining the process, one regulation statement is considered. This does not intent to limit capability/functionality of the system 100 in any manner. Also, even though the working of the system 100 is explained by considering a 'regulation statement' as input, any ambiguous statement (not necessarily be a regulation statement) can be processes using the system 100 for disambiguation.

The system 100 then generates (202) a reference data corresponding to the fetched regulation statement. The system 100 uses a crowd-sourcing mechanism/approach to generate the reference data. The crowd-sourcing mechanism is explained below:

In this process, a plurality of crowd-sourcing information resources are involved, who are subject matter experts in an area/domain the regulation statement is associated with. For the benefit of processing, the plurality of crowd-sourcing information resources are divided into a first set of crowd-sourcing information resources and a second set of crowd-sourcing information resources.

In order to generate (204) the reference data, the system 100, through an appropriate user interface provided by the communication interface 103, displays/provides the regulation statement fetched as input, to a plurality of crowd-sourcing information resources in the first set of crowd-sourcing information resources.

Ambiguities are of different types, such as but not limited to lexical ambiguity, syntactical ambiguity, semantic ambiguity and so on. For example, consider the sentence "Implement hardware, software, and/or procedural mechanisms that record and examine activity in information systems that contain or use electronic protected health information". Examples of the different types of ambiguities for the given sentence are given in Table. 1.

TABLE 1

| Ambiguity type | Question | Answers (Valid answers in bold) |
|---|---|---|
| Lexical | What is the meaning of the term 'record'? | a) to put in writing or digital form for future use b) information stored on a computer c) best performance d) to make a permanent or official note of e) a piece of evidence from the past |
| Syntactic | What word/words refer to the term mechanics? | a) record b) procedural c) software d) examine e) hardware |
| Semantic | What does 'examine activity' mean? | (a) Keep a log of what was done (b) Notify admin that something was done (c) Stop/block what is being done (d) Identify what was done (e) Classify what was done |

The regulation statement may have one or more of different types ambiguities mentioned above. Each crowd-sourcing information sources in the first set of crowd-sourcing information sources labels one or more terms/phrases in the regulation statement as being ambiguous/unambiguous, using appropriate label. The system 100 fetches the labels indicating one or more terms or phrases in the regulation statement as ambiguous/unambiguous, from the first set of crowd-sourcing information sources. Along with the labels, the system 100 fetches a plurality of questions corresponding to each of the one or more terms or phrases labelled as ambiguous, from the first set of crowd-sourcing information sources. The system 100 then provides the regulation statement, the one or more terms or phrases labelled as ambiguous, and the plurality of questions, to a second set of crowd-sourcing information sources for validation. The system 100 prompts each crowd-sourcing information source in the second set of crowd-sourcing information sources to label each of the plurality of questions as valid or invalid, and in turn prompts to provide at least one answer corresponding to all questions labelled as valid. The system 100 then provides the regulation statement, the one or more terms or phrases labelled as ambiguous, the plurality of questions, and the at least one answer corresponding to all questions labelled as valid, to the first set of crowd-sourcing information sources for validation. The crowd-sourcing information sources in the first set of crowd-sourcing information sources label each answer as being valid or invalid. The system 100 then stores the regulation statement, the one or more terms or phrases labelled as ambiguous, an ambiguity score corresponding to each the one or more terms or phrases labelled as ambiguous, the plurality of questions, and the at least one answer labeled as valid, as the reference data in the memory 101. For any regulation statement to be disambiguated, the crowd sourcing approach is performed by the system 100 to generate the reference data.

The system 100 uses an Expectation-Maximization (EM) model to process the reference data to as to disambiguate the regulation statement. In this step, the system 100 determines (206) consensus with respect to one or more terms/phrases in the at least one regulation statement as being ambiguous terms. The system fetches label indicating each term in the regulation statement as being ambiguous or unambiguous, from the reference data. Further, for each label $t_{ijk}$ for $j^{th}$ term of $i^{th}$ regulation statement provided by $k^{th}$ crowd-sourcing information resource, for each term/phrase j, the system 100 determines expertise of a crowd-sourcing information resource ($w_k$) who provided the label by comparing the label with corresponding ground truth data. The system 100 then determines an ambiguity intensity of the $j^{th}$ term or phrase based on variation of the label in comparison with corresponding ground truth data. The system 100 then determines ground truth of the label based on the determined expertise of the crowd-sourcing information source, and the determined ambiguity intensity of the term for which the label has been provided. This is depicted in ambiguity detection phase in FIG. 6.

$$w_k = f(t_{ijk}) \qquad (1)$$

$$a_{ij} = f(t_{ijk}) \qquad (2)$$

$$z_{ijk} = f(t_{ijk}, a_{ij}, w_k) \qquad (3)$$

Where $a_{ij}$=ambiguity intensity of $j^{th}$ term/phrase in $i^{th}$ regulation statement $t_{ijk}$=label for $j^{th}$ term in $i^{th}$ regulation statement, marked by $k^{th}$ crowd-sourcing information resource $z_{ij}$=ground truth for $j^{th}$ term in the $i^{th}$ regulation statement (ambiguous or unambiguous)

The ground truth $z_{ij}$ refers to the determined consensus by the system 100.

The system 100 then fetches (208) a plurality questions corresponding to each term/phrase being determined as ambiguous, from the crowd-sourcing information resources in the first set of crowd-sourcing information resources. As the questions are fetched from different crowd-sourcing information resources in the first set of crowd-sourcing information resources, each having different level of expertise, some of the questions may be valid and some may be invalid (at least in the context of the disambiguation being performed). At this stage the system 100 uses the EM model to determine (210) consensus with respect to at least one of the plurality of questions as belonging to a valid set of questions.

Figure 6:
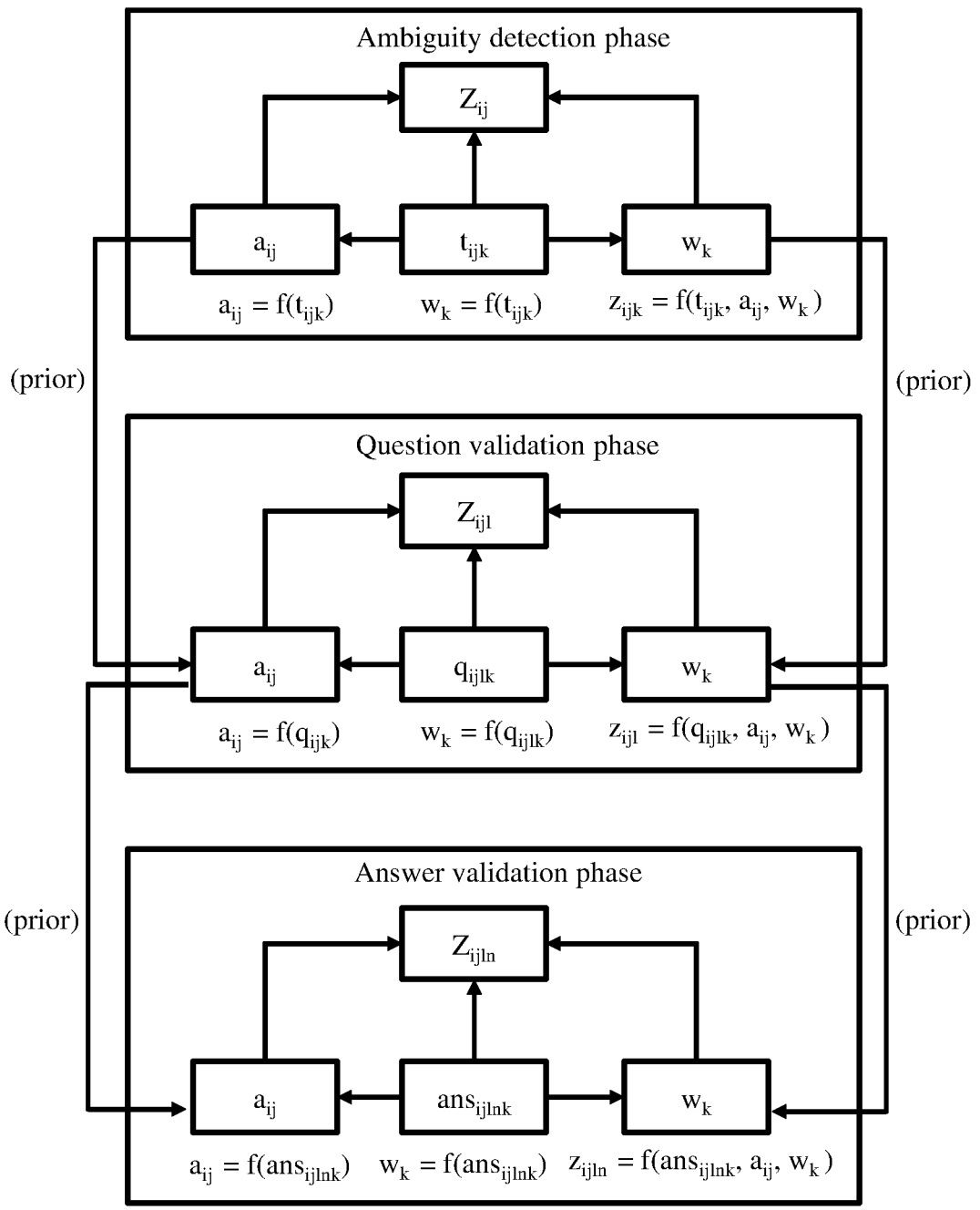
FIG. 6 is an example flow diagram depicting different phases in processing the regulation statement collected as input using the Expectation Maximization (EM) model, using the system of FIG. 1, according to some embodiments of the present disclosure.

In order to obtain the consensus, the system 100 fetches all labels indicating each of the plurality of questions as being valid or invalid, from the reference data, and processes each label $t_{ijk}$ for $j^{th}$ term of $i^{th}$ regulation statement provided by $k^{th}$ crowd-sourcing information resource, for each term j. The system 100 determines expertise of a crowd-sourcing information resource who provided the label by comparing the label with corresponding ground truth data. The system 100 then determines an ambiguity intensity of the $j^{th}$ term or phrase based on extent of variation of the label provided for the $l^{th}$ question by the plurality of crowd-sourcing information resources. The system 100 then determines ground truth of label for the $l^{th}$ question on the $j^{th}$ term of the label based on the determined expertise of the crowd-sourcing information source, and the determined ambiguity intensity of the question for which the label has been provided. Further, all the questions for which the determined consensus of the ground truth is 'valid' are added to the valid set of questions. This is depicted in question validation phase of FIG. 6. As depicted in FIG. 6, prior data from the ambiguity detection phase is fed as input to the question validation phase. The step of determining the consensus of a question as being valid or invalid is represented using the equations below:

$$w_k = f(q_{ijlk}) \quad (4)$$

$$a_{ij} = f(q_{ijlk}) \quad (5)$$

$$Z_{ijl} = f(q_{ijlk}, a_{ij}, w_k) \quad (6)$$

Where
$a_{ij}$=ambiguity intensity of $j^{th}$ term/phrase in $i^{th}$ regulation statement
$q_{ijlk}$=label for $l^{th}$ question on $j^{th}$ term in $i^{th}$ regulation statement, marked by $k^{th}$ crowd-sourcing information resource
$z_{ijl}$=ground truth for $l^{th}$ question on $j^{th}$ term in the $i^{th}$ regulation statement (valid or invalid)

For the at least one question in the valid set of questions, the system 100 collects/fetches (212) a plurality of corresponding answers from the second set of crowd-sourcing information resources. The system 100 then determines (214) consensus with respect to at least one of the plurality of answers as being a valid answer, by processing the reference data using the EM. At this stage, the system 100 fetches labels indicating each of the plurality of answers as being valid or invalid, from the reference data. Further for label $q_{ijlk}$ for $l^{th}$ question for $j^{th}$ term of $i^{th}$ regulation statement provided by $k^{th}$ crowd-sourcing information resource, the system 100 executes/performs the following process. The system 100 determining expertise of a crowd-sourcing information resource who provided the label by comparing the label with corresponding ground truth data. The system 100 further determines an ambiguity intensity of the $j^{th}$ term or phrase based on extent of variation of the label provided for the $ans_{ijnk}$ answer by a plurality of crowd-sourcing information resources. Logic behind this steps is that when the term/phrase is very ambiguous, the confusion in the crowd-sourcing information resources is high, and this leads to more variation in the labels as the crowd-sourcing information resources fail to properly interpret the answers as valid or invalid. The system 100 then determines ground truth label for nth answer of the $l^{th}$ question on the $j^{th}$ term of $i^{th}$ regulation statement based on the determined expertise of the crowd-sourcing information source, and the determined ambiguity intensity of the question for which the label has been provided. This is depicted in answer validation phase of FIG. 6. As depicted in FIG. 6, prior data from the question validation phase is fed as input to the answer validation phase. The step of determining the consensus of with respect to the ground truth is represented using the equations below:

$$w_k = f(ans_{ijlnk}) \quad (7)$$

$$a_{ij} = f(ans_{ijlnk}) \quad (8)$$

$$Z_{ijln} = f(ans_{ijlnk}, a_{ij}, w_k) \quad (9)$$

Where
$ans_{ijlnk}$=label for $n^{th}$ answer of $l^{th}$ question of $j^{th}$ term/phrase in $i^{th}$ regulation statement provided by $k^{th}$ crowd-sourcing information resource
$z_{ijln}$=ground truth label for $n^{th}$ answer for $l^{th}$ question on $j^{th}$ term in the $i^{th}$ regulation statement (valid or invalid)

The system 100 then provides (216) the regulation statement, the one or more terms/phrases determined as ambiguous, valid question(s) corresponding to the one or more terms/phrases determined as ambiguous, valid answers corresponding to the one or more valid questions, as output. In an embodiment, one or more steps in method 200 may be omitted. In another embodiment, the steps in method 200 may be performed in the same order as depicted in FIG. 2 or in any alternate order possible.

At each of the ambiguity detection phase, question validation phase, and the answer validation phase, working of the EM model is explained below:

Consider the Terms $Z_{\{zij\}}$=Set of target values (parameters to be estimated). $z_{ij} \in \{0, 1\}$ is the target value of $j^{th}$ answer for $i^{th}$ regulatory statement. 1 indicates valid answer and 0 indicates invalid answer. i=1, ..., N indicating there are N tasks (regulation statements with a term marked and a question posed on the term) and j=1, ..., M indicating there are M answers provided to each task. For simplicity, the number of answers is fixed as M.

$L_{\{lijk\}}$=Set of annotations l labels, where $l_{ijk}$ is the label provided to answer j of task i by crowd-sourcing information resource k. k=1, ..., P indicating there are P number of crowd-sourcing information resources who have provided labels to this task. P can vary per task. $l_{ijk} \in \{0, 1\}$, where 1 indicates valid answer and 0 indicates invalid answer.

$A_i$=Set of crowd-sourcing information resources who have provided labels to all answers of task i $T_k$=Set of tasks annotated by crowd-sourcing information resource k $a_k$=Probability that a crowd-sourcing information resource k is a spammer,
$\alpha_k \in [0, 1]$ $t_{ij}$=Probability that the $j^{th}$ answer of task i is ambiguous $\rho_0$=Probability that a honest crowd-sourcing information resource (non-spammer) labels an unambiguous invalid answer with ground truth as 0 correctly. This represents True Negative (TN) rate of a crowd-sourcing information resource with $\rho_0 \in [0, 1]$. This parameter is common across all the crowd-sourcing information resources.

$\rho_1$=Probability that a honest crowd-sourcing information resource (non-spammer) labels an unambiguous valid answer with ground truth as 1 correctly. This represents True Positive (TP) rate of a crowd-sourcing information resource with $\rho_1 \in [0, 1]$. This parameter is same across all the crowd-sourcing information resources.

a=A factor which reduces the probability with which a crowd-sourcing information resource labels an ambiguous answer correctly $a \in [0, 1]$ The EM model is used to estimate Z for a given value of L. The set of latent parameters are:

$\theta = <a_k, t_{ij}, \rho_0, \rho_1, a>$ $(\rho_0, \rho_1)$ are kept common among all crowd sourcing resources.

Estimation step (E):

With an assumption that current estimate $\hat{\theta}$ of the latest parameters is available, posterior on target values is computed using equation 10.

$$\hat{P}(z) = \Pi_{i=1}^{N} \Pi_{j=1}^{M} \hat{P}(z_{ij}) \quad (10)$$

$$\hat{P}(z_{ij}) = P(z_{ij}|\zeta) \Pi_{k \in A_i} P(l_{ijk}|z_{ij}, \theta) \quad (11)$$

Equation (11) is rewritten for distinct value of $z_{ij}$ as:

$$\hat{P}(z_{ij}=0) = 0.5 * P(l_{ijk}=0|z_{ij}=0, \hat{\theta}) * P(l_{ijk}=1|z_{ij}=0, \hat{\theta}) \quad (12)$$

$$\hat{P}(z_{ij}=1) = 0.5 * P(l_{ijk}=0|z_{ij}=1, \hat{\theta}) * P(l_{ijk}=1|z_{ij}=1, \hat{\theta}) \quad (13)$$

The 'E' part of the EM model is realized by the system 100 as:

$$P(l_{ijk} = 1 \mid z_{ij} = 1; \theta) = \frac{\hat{\alpha}_k * \hat{t}_{ij}}{2} + \frac{\hat{\alpha}_k * (1 - \hat{t}_{ij})}{2} + \quad (14)$$
$$(1 - \hat{\alpha}_k) * \hat{t}_{ij} * \hat{p}_1 * a + (1 - \hat{\alpha}_k) * (1 - \hat{t}_{ij}) * \hat{p}_1$$

$$P(l_{ijk} = 0 \mid z_{ij} = 0; \theta) = \frac{\hat{\alpha}_k * \hat{t}_{ij}}{2} + \frac{\hat{\alpha}_k * (1 - \hat{t}_{ij})}{2} + \quad (15)$$
$$(1 - \hat{\alpha}_k) * \hat{t}_{ij} * \hat{p}_0 * a + (1 - \hat{\alpha}_k) * (1 - \hat{t}_{ij}) * \hat{p}_0$$

$$P(l\_ijk = 0 \mid z\_ij = 1; \theta) = \frac{\hat{\alpha}_k * \hat{t}_{ij}}{2} + \frac{\hat{\alpha}_k * (1 - \hat{t}_{ij})}{2} + \quad (16)$$
$$(1 - \hat{\alpha}_k) * \hat{t}_{ij} * (1 - \hat{p}_1 * a) + (1 - \hat{\alpha}_k) * (1 - \hat{t}_{ij}) * (1 - \hat{p}_1)$$

$$P(l_{ijk} = 1 \mid z_{ij} = 0; \theta) = \frac{\hat{\alpha}_k * \hat{t}_{ji}}{2} + \frac{\hat{\alpha}_k * (1 - \hat{t}_{ij})}{2} + \quad (17)$$
$$(1 - \hat{\alpha}_k) * \hat{t}_{ij}(1 - \hat{p}_0 * a) + (1 - \hat{\alpha}_k) * (1 - \hat{t}_{ij}) * (1 - \hat{p}_0)$$

Maximization Step (M):

In the maximization step, to estimate latent parameters θ, the system 100 maximizes the expectation of posterior on θ with respect to $\hat{P}(z_{ij})$ from the expectation step. An auxiliary function is maximized as $Q(\theta, \hat{\theta})$. The system 100 may use one or more appropriate alternating maximization algorithm where the parameters are optimized with respect to task parameters of a task or an annotator one at a time. Optimal α is given as:

$$\alpha^* = \underset{\alpha}{\mathrm{argmax}} Q(\alpha, \hat{\alpha}) \quad (18)$$

where $\hat{\alpha}$ is estimation from previous iteration, and $$Q(\alpha, \hat{\alpha}) = E_z[\log P(L \mid Z, \alpha) + \log P(\alpha \mid \varnothing)] = \Sigma_{k=1}^P Q(\alpha_k, \hat{\alpha}_k) \quad (19)$$

where $E_z[.]$ is expectation with respect to $\hat{P}_z$ and $Q(\alpha_k, \hat{\alpha}_k)$ is defined as:

$$Q(\alpha_k, \hat{\alpha}_k) = \underset{\alpha}{\mathrm{argmax}} P(\alpha_k \mid \varnothing) \prod_{i \in T_k} P(l_{ijk} \mid z_{ij}, \theta) \quad (20)$$

Optimization can be carried out separately for each crowd-sourcing information resource and relies on the labels the crowd-sourcing information resource has provided. Auxiliary functions for a different set of latent parameters are given as:

$$Q(t_{ij}, \hat{t}_{ij}) = \underset{t_{ij}}{\mathrm{argmax}} P(t_{ij} \mid \Gamma') \prod_{k \in A_1} P(l_{ijk} \mid z_{ij}, \theta) \quad (21)$$

This EM model is used to determine consensus at different stages of the data processing performed by the system 100 so as to disambiguate the regulation statement collected as input.

Figure 3:
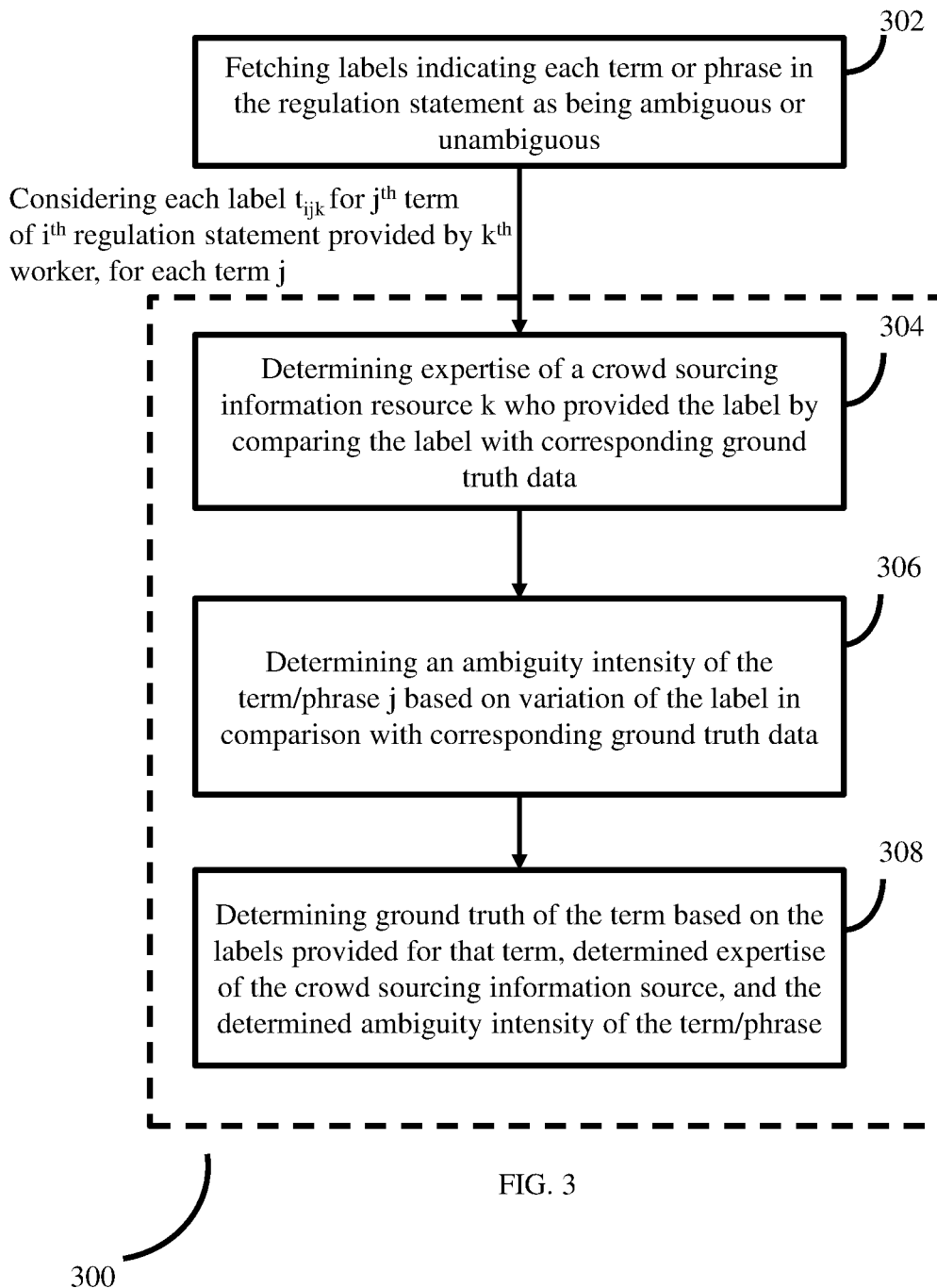
FIG. 3 is a flow diagram depicting steps involved in the process of determining consensus on terms or phrases in a regulation statement being ambiguous or unambiguous, using the system of FIG. 1, according to some embodiments of the present disclosure.

FIG. 3 is a flow diagram depicting steps involved in the process of determining consensus on terms or phrases in a regulation statement being ambiguous or unambiguous, using the system of FIG. 1, according to some embodiments of the present disclosure. The system 100 fetches (302) label indicating each term in the regulation statement as being ambiguous or unambiguous, from the reference data. Further, for each label tijk for jth term in ith regulation statement, the system 100 determines (304) expertise of a crowd-sourcing information resource (wk) who provided the label by comparing the label with corresponding ground truth data. The system 100 then determines (306) an ambiguity intensity of the jth term or phrase based on variation of the label in comparison with corresponding ground truth data. The system 100 then determines (308) ground truth of the label based on the determined expertise of the crowd-sourcing information source, and the determined ambiguity intensity of the term for which the label has been provided. The steps from 304 to 308 are iterated till variation between the ground truth of labels and the labels provided by the plurality of crowd-sourcing information resources is below a threshold. This is depicted in ambiguity detection phase in FIG. 6. In an embodiment, one or more steps in method 300 may be omitted. In another embodiment, the steps in method 300 may be performed in the same order as depicted in FIG. 3 or in any alternate order possible.

Figure 4:
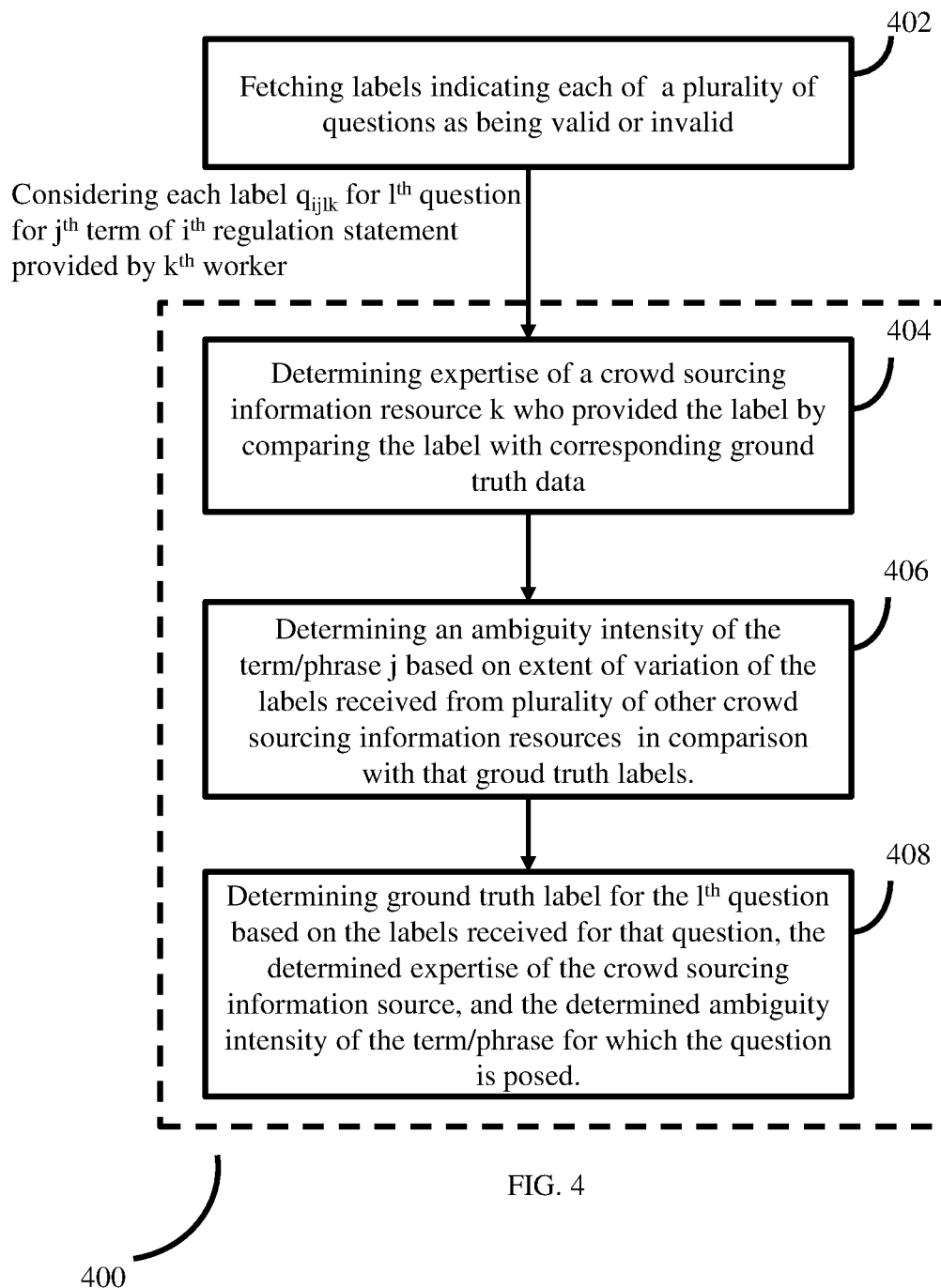
FIG. 4 is a flow diagram depicting steps involved in the process of determining consensus on questions corresponding to one or more ambiguous terms or phrases as being valid or invalid, using the system of FIG. 1, according to some embodiments of the present disclosure.

FIG. 4 is a flow diagram depicting steps involved in the process of determining consensus on questions corresponding to one or more ambiguous terms or phrases as being valid or invalid, using the system of FIG. 1, according to some embodiments of the present disclosure. In order to determine the consensus, the system 100 fetches (402) all labels indicating each of the plurality of questions as being valid or invalid, from the reference data, and processes each label qijlk for lth question on jth term or phrase in ith regulation statement provided by kth crowd-sourcing information resource separately. The system 100 determines (404) expertise of a crowd-sourcing information resource who provided the label by comparing the label with corresponding ground truth data. The system 100 then determines (406) an ambiguity intensity of the jth term or phrase based on extent of variation of the label provided for the lth question by the plurality of crowd-sourcing information resources. The system 100 then determines (408) ground truth of label for the lth question on the jth term of the label based on the determined expertise of the crowd-sourcing information source, and the determined ambiguity intensity of the question for which the label has been provided. Further, all the questions for which the determined consensus of the ground truth is 'valid' are added to the valid set of questions. The steps from 404 to 408 are iterated till variation between the ground truth of labels and the labels provided by the plurality of crowd-sourcing information resources is below a threshold. This is depicted in question validation phase of FIG. 6. As depicted in FIG. 6, prior data from the ambiguity detection phase is fed as input to the question validation phase. In an embodiment, one or more steps in method 400 may be omitted. In another embodiment, the steps in method 400 may be performed in the same order as depicted in FIG. 4 or in any alternate order possible.

Figure 5:
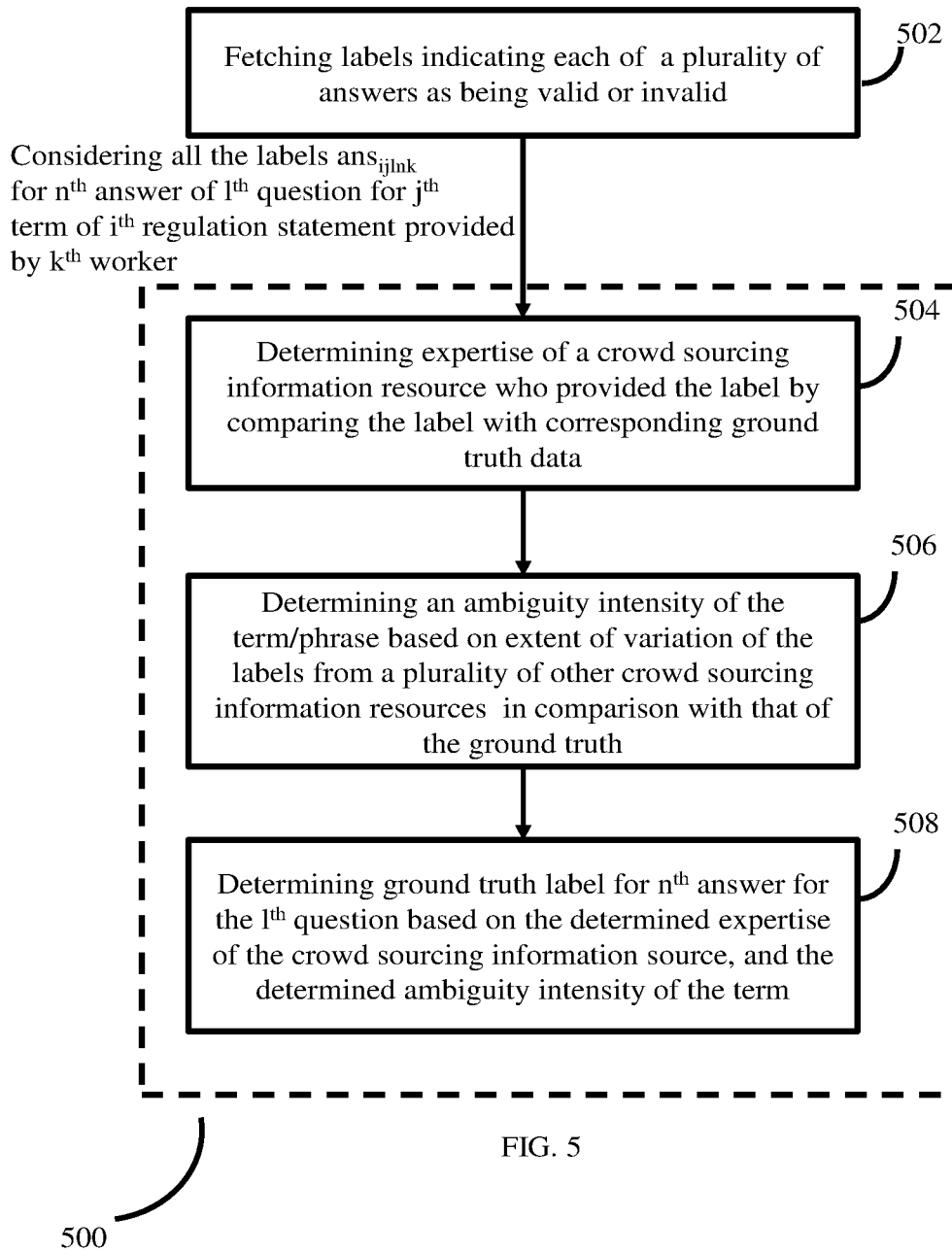
FIG. 5 is a flow diagram depicting steps involved in the process of determining consensus on answers corresponding to one or more questions as being valid or invalid, using the system of FIG. 1, according to some embodiments of the present disclosure.

FIG. 5 is a flow diagram depicting steps involved in the process of determining consensus on answers corresponding to one or more questions as being valid or invalid, using the system of FIG. 1, according to some embodiments of the present disclosure. At this stage, the system 100 fetches (502) labels indicating each of the plurality of answers as being valid or invalid, from the reference data. Further for each answer ansijlnk for lth question on jth term or phrase in ith regulation statement provided by kth crowd-sourcing information resource, the system 100 executes/performs the following process. The system 100 determines (504) expertise of a crowd-sourcing information resource who provided the label by comparing the label with corresponding ground truth data. The system 100 further determines (506) an ambiguity intensity of the jth term or phrase based on extent of variation of the label provided for the $ans_{ijnk}$ answer by a plurality of crowd-sourcing information resources. The system 100 then determines (508) ground truth label for nth answer of the lth question on the jth term of ith regulation statement based on the determined expertise of the crowd-sourcing information source, and the determined ambiguity intensity of the question for which the label has been provided. This is depicted in answer validation phase of FIG. 6. As depicted in FIG. 6, prior data from the question validation phase is fed as input to the answer validation phase. The steps from 504 to 508 are iterated till variation between the ground truth of labels and the labels provided by the plurality of crowd-sourcing information resources is below a threshold. In an embodiment, one or more steps in method 500 may be omitted. In another embodiment, the steps in method 500 may be performed in the same order as depicted in FIG. 5 or in any alternate order possible.

Experimental Results

In the experiment conducted, the system 100 processed 90 tasks (450 answers) together using the EM model and then individually for sets of 30 tasks (150 answers) belonging to each ambiguity type, i.e. lexical, syntactic and semantic. The target values estimated as an outcome of the EM model are compared with the ground truth values provided by the crowd-sourcing information sources. The accuracy results are shown in the Table 2.

TABLE 2

| Task type | Precision | Recall | F-score |
|---|---|---|---|
| Lexical | 80% | 91.8% | 85.5% |
| Syntactic | 83% | 93.9% | 88.1% |
| Semantic | 84.4% | 81.3% | 83% |
| All | 84.54% | 89.86% | 87.12% |

In table. 2 comparatively low recall value of semantic ambiguity tasks indicate that the sentences having the semantic ambiguity are difficult to disambiguate. To measure ambiguity of an answer, an inter-annotator disagreement in terms of weighted Bernoulli variance of the 15 responses is received for every answer. The weights of the Bernoulli variance were decided by expertise of the crowd-sourcing information sources. A correlation of these values of percentage of correct inputs provided by a crowd-sourcing information source with the ambiguity values tij is estimated by the EM model, using Pearson's Correlation Coefficient. The high correlations illustrated in Table. 3 depict the capability of EM to automatically quantify the intensity of ambiguity. 'Spam' of a crowd-sourcing information source also can be determined using the system 100, using the EM model, by finding percentage of incorrect data provided by the crowd-sourcing information source. Correlation of these values with the $\alpha_k$ values are estimated by the EM model. The correlations are illustrated in Table 3. According to the results, the spam is easier to identify for syntactic ambiguity types, whereas difficult for lexical ambiguity.

TABLE 3

| | Correlation | |
|---|---|---|
| | Task ambiguity | Spam (by crowd source) |
| Lexical ambiguity | 0.815 | 0.564 |
| Semantic ambiguity | 0.637 | 0.780 |

TABLE 3-continued

| | Correlation | |
|---|---|---|
| | Task ambiguity | Spam (by crowd source) |
| Syntactic ambiguity | 0.691 | 0.912 |
| All | 0.756 | 0.634 |

TABLE 4

| Task type | Ambiguous tasks | Unambiguous tasks | All |
|---|---|---|---|
| Lexical | 0.279 | 0.124 | 0.191 |
| Syntactic | 0.189 | 0.13 | 0.154 |
| Semantic | 0.547 | 0.364 | 0.486 |
| All | 0.338 | 0.206 | 0.227 |

For each type of ambiguity, 15 tasks having ambiguous terms and 15 tasks having less ambiguous or unambiguous terms were selected. The ambiguity of a term was computed as the average of all the ambiguity intensities of every answer/label to the posed question for that term/phrase. Table 4 shows the averaged ambiguity intensities for all the terms which constitute the ambiguous and less ambiguous tasks. It can be seen that the average ambiguity intensity of ambiguous terms (0.338) is more than that of the less ambiguous or unambiguous terms (0.206). As shown in Table 4, the intensity for syntactic ambiguity is the least (0.154) of the three. This observation is consistent with the F-score for disambiguation for syntactic ambiguity (88.1%), which is highest of the three (Table 4). The relation between ambiguity intensities and disambiguation F-scores is also valid for the other two ambiguity types.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium"

should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for disambiguation of regulation statements, comprising:
    fetching at least one regulation statement as input, via one or more hardware processors;
    generating reference data corresponding to the at least one regulation statement, via the one or more hardware processors;
    processing the reference data using an Expectation-Maximization (EM) model, via the one or more hardware processors, comprising:
    determining consensus with respect to one or more terms in the at least one regulation statement as being ambiguous terms, comprising:
        fetching label indicating each term in the regulation statement as being ambiguous or unambiguous, from the reference data;
        for each label $t_{ijk}$ for $j^{th}$ term in ith regulation statement:
            determining expertise of a crowd-sourcing information resource who provided the label by comparing the label with corresponding ground truth data;
            determining an ambiguity intensity of the $j^{th}$ term or phrase based on variation of the label in comparison with corresponding ground truth data; and
            determining ground truth of the label based on the determined expertise of the crowd-sourcing information source, and the determined ambiguity intensity of the term for which the label has been provided;
    fetching a plurality of questions corresponding to the one or more ambiguous terms;
    determining consensus with respect to at least one of the plurality of questions as belonging to a valid set of questions, comprising:
        fetching all labels indicating each of the plurality of questions as being valid or invalid, from the reference data;
        for each label $q_{ijlk}$, for $l^{th}$ question on $j^{th}$ term or phrase in ith regulation statement provided by $k^{th}$ crowd-sourcing information resource:
            determining expertise of a crowd-sourcing information resource who provided the label by comparing the label with corresponding ground truth data;
            determining an ambiguity intensity of the $j^{th}$ term or phrase based on extent of variation of the label provided for the $l^{th}$ question by the plurality of crowd-sourcing information resources; and
            determining ground truth of label for the $l^{th}$ question on the $j^{th}$ term of the label based on the determined expertise of the crowd-sourcing information source, and the determined ambiguity intensity of the question for which the label has been provided; and
        adding at least one question for which the determined ground truth is valid, to the valid set of questions;
    fetching a plurality of answers corresponding to the at least one question belonging to the valid set of questions, from the reference data;
    determining consensus with respect to at least one of the plurality of answers as being a valid answer, comprising:
        fetching labels indicating each of the plurality of answers as being valid or invalid, from the reference data;
        for each answer $ans_{ijlnk}$ for $l^{th}$ question on $j^{th}$ term or phrase in $i^{th}$ regulation statement provided by $k^{th}$ crowd-sourcing information resource:
            determining expertise of a crowd-sourcing information resource who provided the label by comparing the label with corresponding ground truth data;
            determining an ambiguity intensity of the $j^{th}$ term or phrase based on extent of variation of the label provided for the $ans_{ijnk}$ answer by a plurality of crowd-sourcing information resources; and
            determining ground truth label for nth answer of the $l^{th}$ question on the $j^{th}$ term of ith regulation statement based on the determined expertise of the crowd-sourcing information source, and the determined ambiguity intensity of the question for which the label has been provided,
        wherein the processing of the reference data using the EM model is iterated till
        extent of variation between the fetched labels and the ground truth data; and
    providing the at least one regulation statement, the one or more ambiguous terms, an ambiguity score of each of the one or more ambiguous terms or phrases, the at least one question belonging to the valid set of questions, the at least one valid answer, as output.

2. The method of claim 1, wherein the reference data is generated by a crowd-sourcing mechanism, comprising:
    providing the regulation statement to a first set of crowd-sourcing information sources;
    fetching labels indicating one or more terms or phrases in the regulation statement as ambiguous, from the first set of crowd-sourcing information sources;
    fetching a plurality of questions corresponding to each of the one or more terms or phrases labelled as ambiguous, from the first set of crowd-sourcing information sources;
    providing the regulation statement, the one or more terms or phrases labelled as ambiguous, and the plurality of questions, to a second set of crowd-sourcing information sources for validation;
    fetching labels indicating each of the plurality of questions as valid or invalid, and at least one answer corresponding to all questions labelled as valid, from the second set of crowd-sourcing information sources;
    providing the regulation statement, the one or more terms or phrases labelled as ambiguous, the plurality of questions, and the at least one answer corresponding to all questions labelled as valid, to the first set of crowd-sourcing information sources for validation;
    fetching labels indicating that the at least one answer is valid, from the first set of crowd-sourcing information sources; and
    storing the regulation statement, the one or more terms or phrases labelled as ambiguous, an ambiguity score corresponding to each the one or more terms or phrases labelled as ambiguous, the plurality of questions, and the at least one answer labeled as valid, as the reference data.

3. A system for disambiguation of regulation statements, comprising:
one or more communication interfaces 103;
a memory module 101 storing a plurality of instructions; and
one or more hardware processors 102 coupled to the memory module 101 via the one or more communication interfaces 103, wherein the one or more hardware processors 102 are configured by the instructions to:
fetch at least one regulation statement as input;
generate reference data corresponding to the at least one regulation statement;
process the reference data using an Expectation-Maximization (EM) model, comprising:
determining consensus with respect to one or more terms in the at least one regulation statement as being ambiguous terms, comprising:
fetching label indicating each term in the regulation statement as being ambiguous or unambiguous, from the reference data;
for each label $t_{ijk}$ for $j^{th}$ term in ith regulation statement:
determining expertise of a crowd-sourcing information resource who provided the label by comparing the label with corresponding ground truth data;
determining an ambiguity intensity of the $j^{th}$ term or phrase based on variation of the label in comparison with corresponding ground truth data; and
determining ground truth of the label based on the determined expertise of the crowd-sourcing information source, and the determined ambiguity intensity of the term for which the label has been provided;
fetching a plurality of questions corresponding to the one or more ambiguous terms;
determining consensus with respect to at least one of the plurality of questions as belonging to a valid set of questions, comprising:
fetching all labels indicating each of the plurality of questions as being valid or invalid, from the reference data;
for each label $q_{ijlk}$ for lth question on $j^{th}$ term or phrase in ith regulation statement provided by kth crowd-sourcing information resource:
determining expertise of a crowd-sourcing information resource who provided the label by comparing the label with corresponding ground truth data;
determining an ambiguity intensity of the $j^{th}$ term or phrase based on extent of variation of the label provided for the lth question by a plurality of crowd-sourcing information resources; and
determining ground truth of the lth question on the $j^{th}$ term of the label based on the determined expertise of the crowd-sourcing information source, and the determined ambiguity intensity of the question for which the label has been provided; and
adding at least one question for which the determined ground truth is valid, to the valid set of questions;
fetching a plurality of answers corresponding to the at least one question belonging to the valid set of questions, from the reference data;
determining consensus with respect to at least one of the plurality of answers as being a valid answer, comprising:
fetching a labels indicating each of the plurality of answers as being valid or invalid, from the reference data;
for each answer $ans_{ijnk}$ for lth question on $j^{th}$ term or phrase in ith regulation statement provided by kth crowd-sourcing information resource:
determining expertise of a crowd-sourcing information resource who provided the ambiguity label by comparing the label with corresponding ground truth data;
determining an ambiguity intensity of the $j^{th}$ term or phrase based on extent of variation of the label provided for the $ans_{ijnk}$ answer by a plurality of crowd-sourcing information resources; and
determining ground truth label for nth answer of the lth question on the $j^{th}$ term of $i^{th}$ regulation statement based on the determined expertise of the crowd-sourcing information source, and the determined ambiguity intensity of the question for which the label has been provided,
wherein the processing of the reference data using the EM model is iterated till
extent of variation between the fetched labels and the ground truth data; and
providing the at least one regulation statement, the one or more ambiguous terms, an ambiguity score of each of the one or more ambiguous terms, the at least one question belonging to the valid set of questions, the at least one valid answer, as output.

4. The system of claim 3, wherein the system is configured to generate the reference data by a crowd-sourcing mechanism, comprising:
providing the regulation statement to a first set of crowd-sourcing information sources;
fetching labels indicating one or more terms or phrases in the regulation statement as ambiguous, from the first set of crowd-sourcing information sources;
fetching a plurality of questions corresponding to each of the one or more terms or phrases labelled as ambiguous, from the first set of crowd-sourcing information sources;
providing the regulation statement, the one or more terms or phrases labelled as ambiguous, and the plurality of questions, to a second set of crowd-sourcing information sources for validation;
fetching labels indicating each of the plurality of questions as valid or invalid, and at least one answer corresponding to all questions labelled as valid, from the second set of crowd-sourcing information sources;
providing the regulation statement, the one or more terms or phrases labelled as ambiguous, the plurality of questions, and the at least one answer corresponding to all questions labelled as valid, to the first set of crowd-sourcing information sources for validation;
fetching labels indicating that the at least one answer is valid, from the first set of crowd-sourcing information sources; and
storing the regulation statement, the one or more terms or phrases labelled as ambiguous, an ambiguity score corresponding to each the one or more terms or phrases labelled as ambiguous, the plurality of questions, and the at least one answer labeled as valid, as the reference data.

5. A non-transitory computer readable medium for disambiguation of regulation statements, comprising:
fetching at least one regulation statement as input, via one or more hardware processors;
generating reference data corresponding to the at least one regulation statement, via the one or more hardware processors;
processing the reference data using an Expectation-Maximization(EM) model, via the one or more hardware processors, comprising:
determining consensus with respect to one or more terms in the at least one regulation statement as being ambiguous terms, comprising:
fetching label indicating each term in the regulation statement as being ambiguous or unambiguous, from the reference data;
for each label $t_{ijk}$ for term in $i^{th}$ regulation statement:
determining expertise of a crowd-sourcing information resource who provided the label by comparing the label with corresponding ground truth data;
determining an ambiguity intensity of the $j^{th}$ term or phrase based on variation of the label in comparison with corresponding ground truth data; and
determining ground truth of the label based on the determined expertise of the crowd-sourcing information source, and the determined ambiguity intensity of the term for which the label has been provided;
fetching a plurality of questions corresponding to the one or more ambiguous terms;
determining consensus with respect to at least one of the plurality of questions as belonging to a valid set of questions, comprising:
fetching all labels indicating each of the plurality of questions as being valid or invalid, from the reference data;
for each label for $q_{ijlk}$ for $l^{th}$ question on $j^{th}$ term or phrase in $i^{th}$ regulation statement provided by $k^{th}$ crowd-sourcing information resource:
determining expertise of a crowd-sourcing information resource who provided the label by comparing the label with corresponding ground truth data;
determining an ambiguity intensity of the $j^{th}$ term or phrase based on extent of variation of the label provided for the $l^{th}$ question by the plurality of crowd-sourcing information resources; and
determining ground truth of label for the $l^{th}$ question on the $j^{th}$ term of the label based on the determined expertise of the crowd-sourcing information source, and the determined ambiguity intensity of the question for Which the label has been provided; and
adding at least one question for which the determined ground truth is valid, to the valid set of questions;
fetching a plurality of answers corresponding to the at least one question belonging to the valid set of questions; from the reference data;
determining consensus with respect to at least one of the plurality of answers as being a valid answer, comprising:
fetching labels indicating each of the plurality of answers as being valid or invalid, from the reference data;
for each answer $ans_{ijlnk}$ for $l^{th}$ question on $j^{th}$ term or phrase in ith regulation statement provided by kth crowd-sourcing information resource:
determining expertise of a crowd-sourcing information resource who provided the label by comparing the label with corresponding ground truth data;
determining an ambiguity intensity of the $j^{th}$ term or phrase based on extent of variation of the label provided for the $ans_{ijnk}$ answer by a plurality of crowd-sourcing information resources; and
determining ground truth label for $n^{th}$ answer of the $l^{th}$ question on the $j^{th}$ term of $i^{th}$ regulation statement based on the determined expertise of the crowd-sourcing information source; and the determined ambiguity intensity of the question for which the label has been provided,
wherein the processing of the reference data using the EM model is iterated till extent of variation between the fetched labels and the ground truth data; and
providing the at least one regulation statement, the one or more ambiguous terms, an ambiguity score of each of the one or more ambiguous terms or phrases, the at least one question belonging to the valid set of questions, the at least one valid answer, as output.

6. The non-transitory computer readable medium of claim 5, wherein the reference data is generated by a crowd-sourcing mechanism, comprising:
providing the regulation statement to a first set of crowd-sourcing information sources;
fetching labels indicating one or more terms or phrases in the regulation statement as ambiguous, from the first set of crowd-sourcing information sources;
fetching a plurality of questions corresponding to each of the one or more terms or phrases labelled as ambiguous, from the first set of crowd-sourcing information sources;
providing the regulation statement, the one or more terms or phrases labelled as ambiguous, and the plurality of questions, to a second set of crowd-sourcing information sources for validation;
fetching labels indicating each of the plurality of questions as valid or invalid, and at least one answer corresponding to all questions labelled as valid, from the second set of crowd-sourcing information sources;
providing the regulation statement, the one or more terms or phrases labelled as ambiguous, the plurality of questions, and the at least one answer corresponding to all questions labelled as valid, to the first set of crowd-sourcing information sources for validation;
fetching labels indicating that the at least one answer is valid, from the first set of crowd-sourcing information sources; and
storing the regulation statement, the one or more terms or phrases labelled as ambiguous, an ambiguity score corresponding to each the one or more terms or phrases labelled as ambiguous, the plurality of questions, and the at least one answer labeled as valid, as the reference data.

* * * * *